United States Patent [19]

Brennan et al.

[11] 4,146,889
[45] Mar. 27, 1979

[54] METHOD AND APPARATUS FOR SIDELOBE REDUCTION IN RADAR

[75] Inventors: Lawrence E. Brennan, Tarzana; Irving S. Reed, Santa Monica; Peter Swerling, Pacific Palisades, all of Calif.

[73] Assignee: Technology Service Corporation, Santa Monica, Calif.

[21] Appl. No.: 219,227

[22] Filed: Jan. 20, 1972

[51] Int. Cl.² ............................ G01S 3/38; G01S 1/02
[52] U.S. Cl. ............................... 343/5 R; 343/100 LE; 343/100 TD
[58] Field of Search ......... 343/7 A, 100 LE, 100 TD, 343/5 R

[56] References Cited

U.S. PATENT DOCUMENTS

| 3,167,761 | 1/1965 | Le Parquier | 343/100 LE |
| 3,435,453 | 3/1969 | Howard | 343/100 LE |

*Primary Examiner*—Howard A. Birmiel
*Attorney, Agent, or Firm*—Freilich, Hornbaker, Wasserman, Rosen & Fernandez

[57] ABSTRACT

In a system for reducing sidelobes in adaptive receiving array antennas, an auxiliary signal is radiated through an omnidirectional antenna collocated with the phase center of an adaptive array antenna. The auxiliary signal is so transmited as to form a probe or pilot beam with a notch in the main-beam direction by transmitting through both the omnidirectional and the array antenna simultaneously. The relative phases of both antennas are controlled to obtain near-zero radiation in the main-beam direction. Adaptive control loops receive returns from the probe beam and adjust the weights of the receiving array antenna. The receiving array weights are used to form a low sidelobe antenna pattern for reception of the main radar signal, which is transmitted with a directional pattern. Either time or frequency separation may be used to distinguish the probe beam from the main beam.

6 Claims, 7 Drawing Figures

METHOD AND APPARATUS FOR SIDELOBE REDUCTION IN RADAR

BACKGROUND OF THE INVENTION

This invention relates to a method and apparatus for adaptive signal processing in radars, and more particularly to an improved method and apparatus for adaptive receiving array antennas to reduce sidelobes.

Adaptive receiving array antennas are useful for many purposes, such as to reduce noise from jammers. Such an antenna is one in which signals received by array elements are amplified individually. The phase and amplitude of each element output is controlled by an adaptive control loop as a function of the array output, and then added coherently at RF or IF frequencies to provide the array output. However, in order to develop an adaptive array which reduces sidelobes, main-beam clutter must be separated from sidelobe clutter returns.

SUMMARY OF THE INVENTION

In accordance with the invention, an auxiliary signal is radiated through an omnidirectional antenna collocated with the phase center of an adaptive array antenna. The auxiliary, omnidirectional signal is transmitted as a probe or pilot beam with a notch in the direction of the main lobe radiated by the adaptive array antenna. Returns from this probe beam are received by all elements of the array and fed to adaptive control loops where complex weights are developed in the following manner. The complex conjugate $v_n^*$ of the return $v_n$ from a given element is multiplied by the adaptive array output E for the probe beam, where the auxiliary array output is given by $$E = \sum_{n=1}^{N} w_n v_n \qquad (1)$$

The steady state weights are given by $$W = (M + I/G)^{-1} S^* \qquad (2)$$

Where W denotes a column vector of the weights $w_n$, M is the clutter covariance matrix, I is the identity matrix, G is the loop gain, and S* is the steering vector. The product $z_n$ of the complex conjugate $v_n^*$ and the auxiliary array output E is low-pass filtered, thereby producing a cross-correlation signal $u_n$ which is subtracted from a steering signal $s_n^*$ to obtain the weight $w_n$. These same weights are then used to synthesize the radar receiving pattern and detect targets in the main transmitted beam by multiplying the return signal $v_n'$ of the main transmitted radar pattern received through a given element by its corresponding weight $w_n$. The auxiliary transmitted omnidirectional pattern is distinguished from the main transmitted radar pattern using either time or frequency separation.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
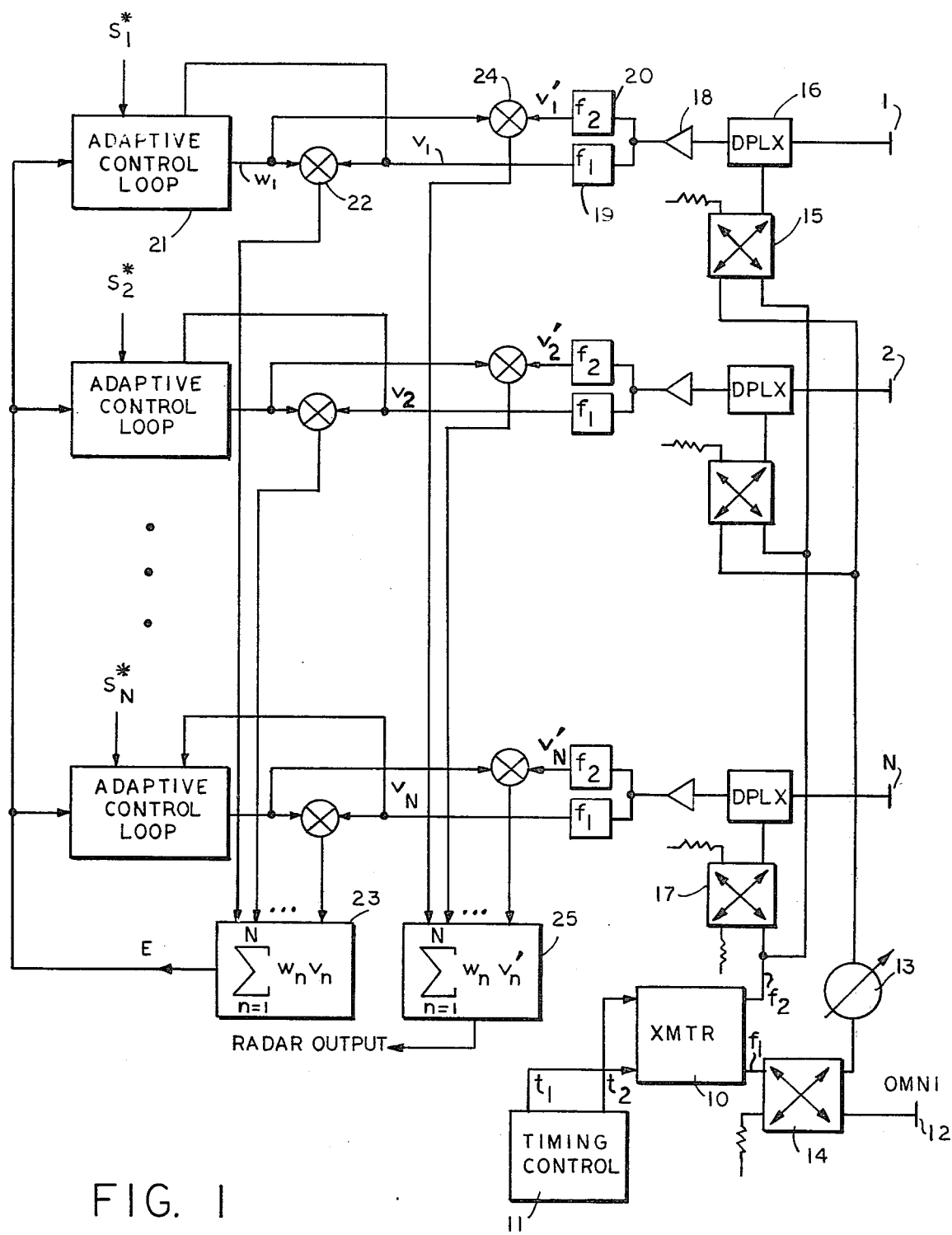
FIG. 1 is a block diagram of an adaptive receiving antenna system for sidelobe reduction in radars according to the present invention.

Referring now to FIG. 1, an exemplary phased-array antenna is shown having a plurality of elements 1 to N in a linear array, and embodying a technique for sidelobe reduction which constitutes the present invention. However, it should be understood that this technique may also be employed in planar and conformal arrays where sidelobe reduction is required in either azimuth or elevation, or both. In such a case, any known technique may be employed to appropriately combine the outputs of discrete elements in columns and rows to form antenna elements. Accordingly, the term "element" is employed hereinafter to refer to a discrete antenna element in a linear array or a group of combined elements in a planar or conformal array. Thus, for sidelobe reduction in azimuth or elevation, the term "group" in this definition of the term "element" should be understood to mean "column" or "row".

In a phased-array antenna, the signals received by the array elements can be added directly at RF to form a received beam, or can be amplified individually and then added coherently at RF or IF. The latter method is used in adaptive arrays to which the present invention relates. In such an adaptive array, the phase and amplitude of each element signal $v_n$ is controlled by an adaptive control loop which develops a weight $w_n$ in accordance with Equation (2) and multiplies the signal $v_n$ by that weight before the sum is formed according to Equation (1).

In the present invention, to be described more fully hereinafter, the signal $v_n$ is a return from a probe beam transmitted through an omnidirectional antenna with a notch (quiet sector) in the main-lobe direction of the array beam pattern. Accordingly, the weight $w_n$ developed for the probe signal $v_n$ is a function of clutter in the sidelobes. The return signal $v_n'$ from the array main transmitted beam is then multiplied by the same weight $w_n$ developed for the probe signal $v_n$. In that manner the adaptive array senses the distribution of the sidelobe clutter illuminated by the probe signal, plus other interference such as signals from jammers, and optimizes the array weights used to synthesize the main radar receiving pattern and detect targets in the main lobe.

This technique assumes that the clutter and other interference in the probe signal will be the same for the main radar signal, a condition which can be assumed if the probe signal is at or near the main radar signal frequency. If the probe signal is at the main radar frequency, the notched omnidirectional antenna pattern can be distinguished from the main radar pattern using time separation achieved by transmitting a probe pulse, or a few probe pulses in sequence if necessary, in a new array antenna scan direction. Returns from these probe signals are used to achieve the weights for an optimum illumination function on the adaptive receiving array.

Main radar pulses are subsequently transmitted for searching, tracking, etc., using the optimum receiving illumination function developed with the probe pulse, or pulses.

In some applications it may be desirable to continually update the illumination function even though a new array antenna direction has not been reached. That is easily accomplished with a timing control unit which interrupts the radar pulse train periodically to transmit a probe pulse, or pulses notched in the desired beam direction. With a slightly more complex control unit, a probe pulse may be transmitted upon an incremental change of direction of predetermined magnitude and thereafter upon predetermined increments of time, using a PRF counter to measure the increments of time, and restarting that counter upon transmitting a probe pulse in a new direction.

Each time a probe pulse is transmitted, the circuit for forming the product $w_n v_n'$ is gated off for the necessary interval to avoid forming a main radar output from the probe return. At the same time, the circuit for forming the product $w_n v_n$ is turned on. During a main radar pulse period, the latter circuit is turned off and the optimum illumination function developed during the last probe pulse period is retained. Meantime the former circuit is turned on to synthesize the main radar receiving pattern and detect targets in the main lobe.

The probe signal can also be distinguished from the main radar signal by using frequency separation in a manner illustrated in FIG. 1. A frequency band adjacent to the main radar signal band is used for the probe signal. Two probe bands, one on each side of the main radar signal, could be used to provide better average performance in systems where the bandwidth aperture product is moderately large. In systems of large bandwidth aperture product, a probe band (or bands) could be generated within the main radar signal bandwidth. For example, with linear FM pulse compression, a section in the center of the transmitted pulse could be used for probe signals. These other possibilities differ only in the manner in which a transmitter is controlled to transmit the probe and main radar pulses at substantially the same time.

An embodiment employing only one probe signal band adjacent to the main radar signal band is illustrated in FIG. 1. In general, a transmitter 10 is operated by a timing control unit 11 at a frequency $f_1$ for a short period of time (microseconds) to transmit a probe pulse, and then is held silent for a longer period (milliseconds) during which return signals $v_1$ to $v_n$ of the omnidirectional pattern is processed to develop the weights $w_1$ to $w_n$ for the adaptive receiving antenna. The transmitter is also operated to transmit a radar pulse at a frequency $f_2$ immediately after the probe pulse, thus transmitting a main radar pulse at substantially the same time as the probe pulse in order to receive return signals from the probe pattern while receiving return signals from the main pattern.

To produce an omnidirectional probe pattern having a notch in the main lobe sector, the pulse at frequency $f_1$ is transmitted through both an omnidirectional antenna 12 and all or part of the array of elements 1 to N. The relative phase and amplitude of the two resulting patterns at frequency $f_1$ are controlled, for example, by a phase shifter 13 and the coupling factor of a directional coupler 14 in order to obtain near-zero radiation in the main-lobe sector of the array pattern.

Less than all of the elements in the array are used to form the probe pattern in the embodiment illustrated in order to provide a wider notch than the main lobe produced in the radar pattern by the pulse transmitted at the frequency $f_2$ through all of the elements 1 to N for reasons to be set forth hereinafter.

For the proper phase relationship required between the omnidirectional antenna and the array (or part of the array) transmitting at the frequency $f_1$ to produce the notched omnidirectional beam pattern, the omnidirectional antenna must be collocated with the phase center of the array or part of the array used. That may be most easily accomplished by placing the omnidirectional antenna at the geometric center of the array, or part of the array being used.

Directional couplers are employed to couple the pulses at frequencies $f_1$ and $f_2$ to the elements as required. For example, a directional coupler 15 couples the pulses to the element 1 via a duplexer 16. The coupling factor and phase shift of the coupler 15 is taken into consideration in selecting the coupler 14 and phase shifter 13. A similar directional coupler is employed with only one input for the elements not used in forming the notched omnidirectional probe pattern, such as coupler 17 for element N.

The omnidirectional antenna 12 may in practice be one of the slots or dipoles in the array, located at or near the phase center of the array transmitting the probe signal, instead of a separate element as shown. That could be accomplished by connecting the second output ($f_2$) of the transmitter 10 to the second input of the coupler 14. A duplexer would then be provided in the usual manner to permit the omnidirectional antenna to be used for transmission and reception by switching the antenna between the transmitter and a receiver adaptive control loop, and isolating the control loop during the period of high-power transmission.

Although not all of the elements 1 to N in the array are used in the transmission of the notched omnidirectional probe pattern, all are used in the reception of the probe pattern to develop for each element a weight, and thus achieve an optimum illumination function for the entire array. The adaptive control loop which produces the weight to a given element is the same in organization and operation as the adaptive control loop which produces the weight for any other element. Accordingly, only one adaptive control loop for a given element will be described with reference to FIG. 2. But first the system of FIG. 1, will be further described, with reference to the signal channels for the element 1, channels for all other elements being similar.

A low-noise amplifier 18 couples the return of the element 1 from the duplexer 16 to band-pass filters 19 and 20 to separate the respective frequencies $f_1$ and $f_2$. The signal $v_1$ at frequency $f_1$ is then applied to an adaptive control loop 21 which develops a weight signal $w_1$ applied to a multiplier (mixer) 22 to form the product $w_1 v_1$. This product is combined with all other similar products $w_n v_n$ by a summing network 23 to form an output signal E which is fed back to all adaptive control loops as shown. The theory of adaptive control loops for adaptive array receiving antennas has been described in IEEE Transactions on Aerospace and Electronic Systems, Vol. AES-7, No. 2, March 1971 at pages 254 to 262 by Lawrence E. Brennan et al. In that manner, an optimum illumination function is developed for the adaptive array in the form of a weight $w_n$ for a given element to reduce sidelobes of the main radar pattern.

By developing the weights from probe signal returns, the sidelobes with the most clutter, plus other interference, are reduced the most. This is so because the adaptive control loops sense the distribution of clutter in the sidelobes which have been illuminated by the notched probe signal, as noted hereinbefore. The sets of weights $\{w_n\}$ thus developed by the adaptive control loops are then applied to separate multipliers (mixers) to synthesize the main radar receiving antenna, such as a multiplier 24 for the signal $v_1'$ at frequency $f_2$. The elements of the set $\{w_n v_n'\}$ are added by a second summing network 25 to form the radar output signal.

Figure 2:
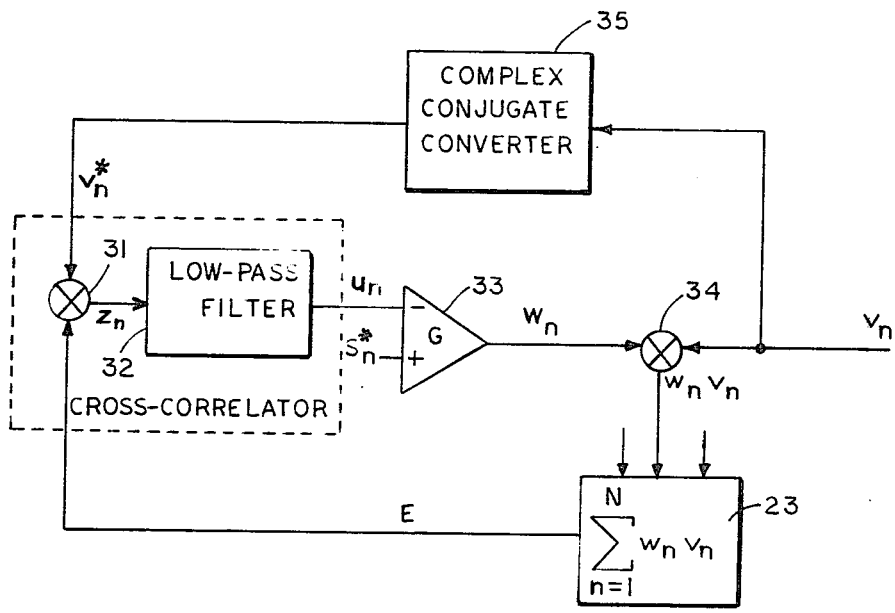
FIG. 2 is a block diagram of an adaptive control loop for the system of FIG. 1.

Referring now to FIG. 2, the control loops for a given complex weight $w_n$ will now be described. The control loop is comprised of a multiplier 31 and a low-pass filter 32 which provide a cross-correlation function $u_n$ between $v_n^*$ and the output E. In channels where this correlation is large, the complex weight at the output of an amplifer 33 will change more rapidly than in channels of low correlation. The complex weight is formed by the amplifier 33 according to the following equation:

$$W_n = (s^*_n - u_n)G \qquad (21)$$

where G is a gain factor of the amplifier and $s_n^*$ is the complex steering signal in the nth loop. The conjugate $v_n^*$ is used to form the cross-correlation function and is obtained from a complex conjugate converter 35 according to the equation $v_n^* = R(t)\sin[\omega_o t - \phi(t)]$, where $v_n = R(t)\sin[\omega_o t + \phi(t)]$, R(t) is the signal amplitude (envelope), $\sin \omega_o(t)$ is the carrier and $\phi(t)$ is the phase modulation of the carrier. The complex conjugate $v_n^*$ is multiplied by E to obtain a signal $z_n$ which is low-pass filtered and subtracted from $s_n^*$ to obtain the weight signal $w_n$. By so limiting the amplitude of the complex conjugate $v_n^*$ that R(t) = 1, dynamic range effects are reduced in the adaptive system.

The sum signal E is derived from the set of signals $\{v_n\}$ by multiplication by the respective ones of the developed set of weights $\{w_n\}$. Accordingly, each signal $v_n$ is applied to a multiplier 34, corresponding to the multiplier 22 of the channel for element 1 in FIG. 1, to form the product $w_n v_n$ applied to the summing network 23. As just noted, the set of complex weights $\{w_n\}$ are produced by adaptive control loops which are identical, except for differences in a set of steering signals $\{s_n^*\}$.

Figure 3:
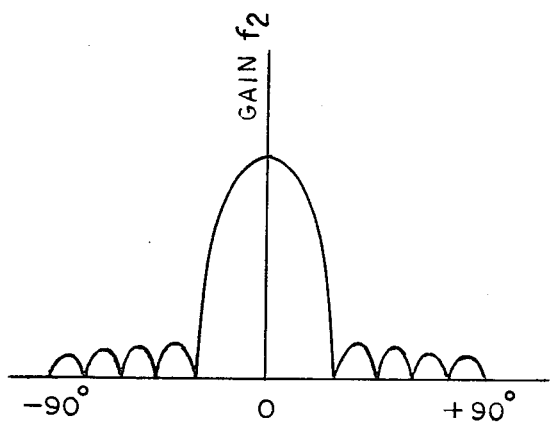
FIGS. 3 and 4 illustrate typical probe and beam patterns, respectively.
Figure 4:
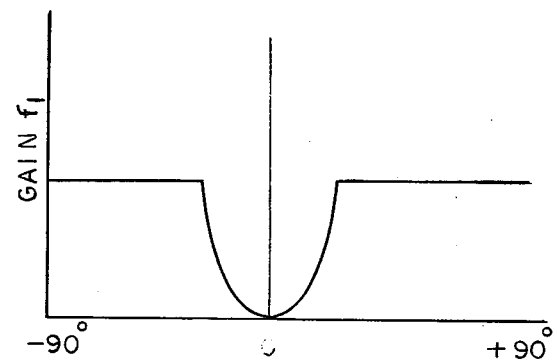

The graphs of FIGS. 3 and 4 illustrate typical probe and main beam patterns, respectively. The width of the notch in the pattern of FIG. 4 may be controlled by selecting the number of elements used to transmit the auxiliary signal at the frequency $f_1$, i.e. by controlling the width of the main lobe in the auxiliary signal transmitted by the array for cancellation of radiation from the omnidirectional antenna at the same frequency. The object is to so adjust that notch as to maximize sidelobe reduction.

Figure 5:
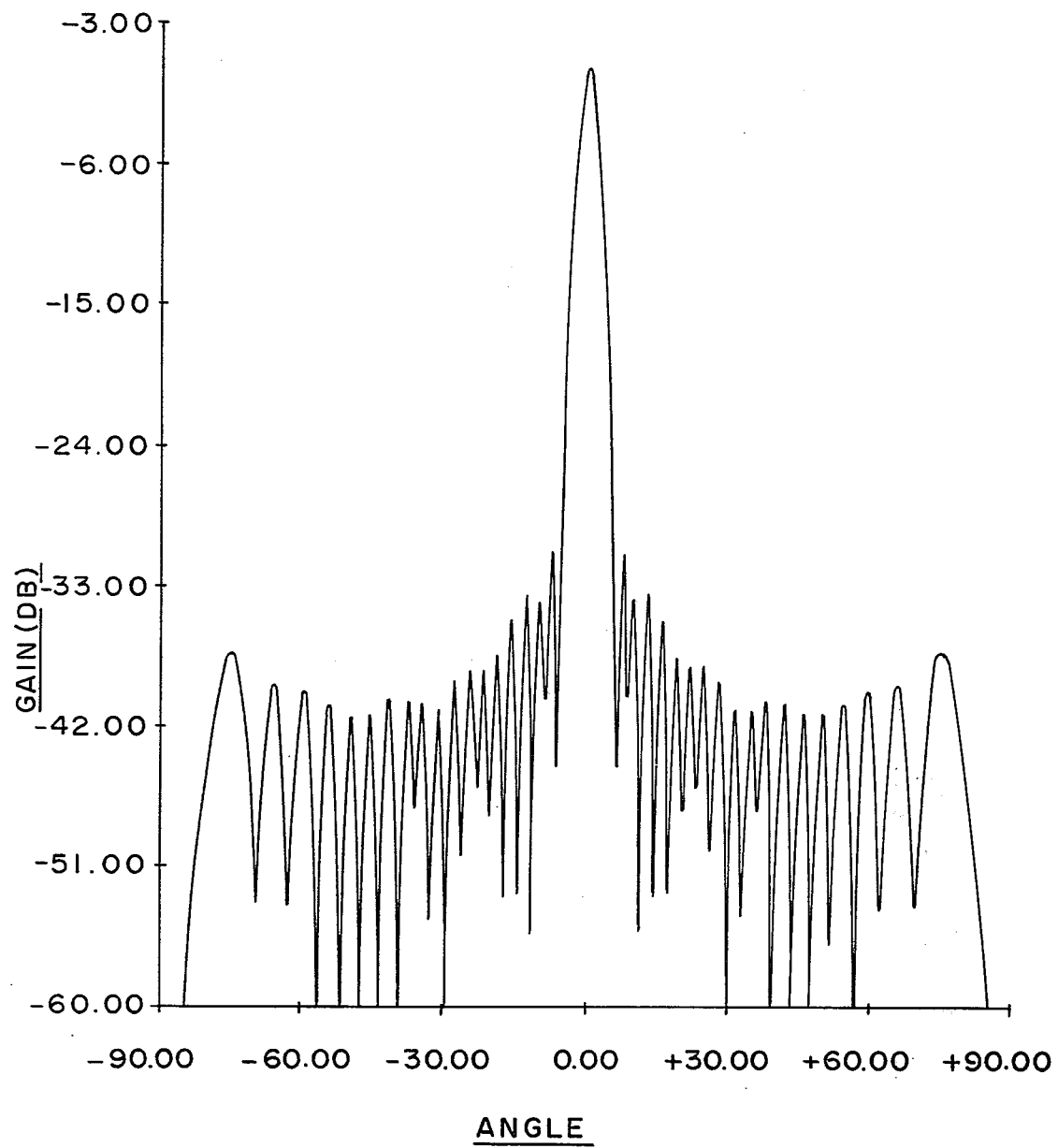
FIGS. 5-7 illustrate the effects of the sidelobe reduction technique of the present invention.
Figure 6:
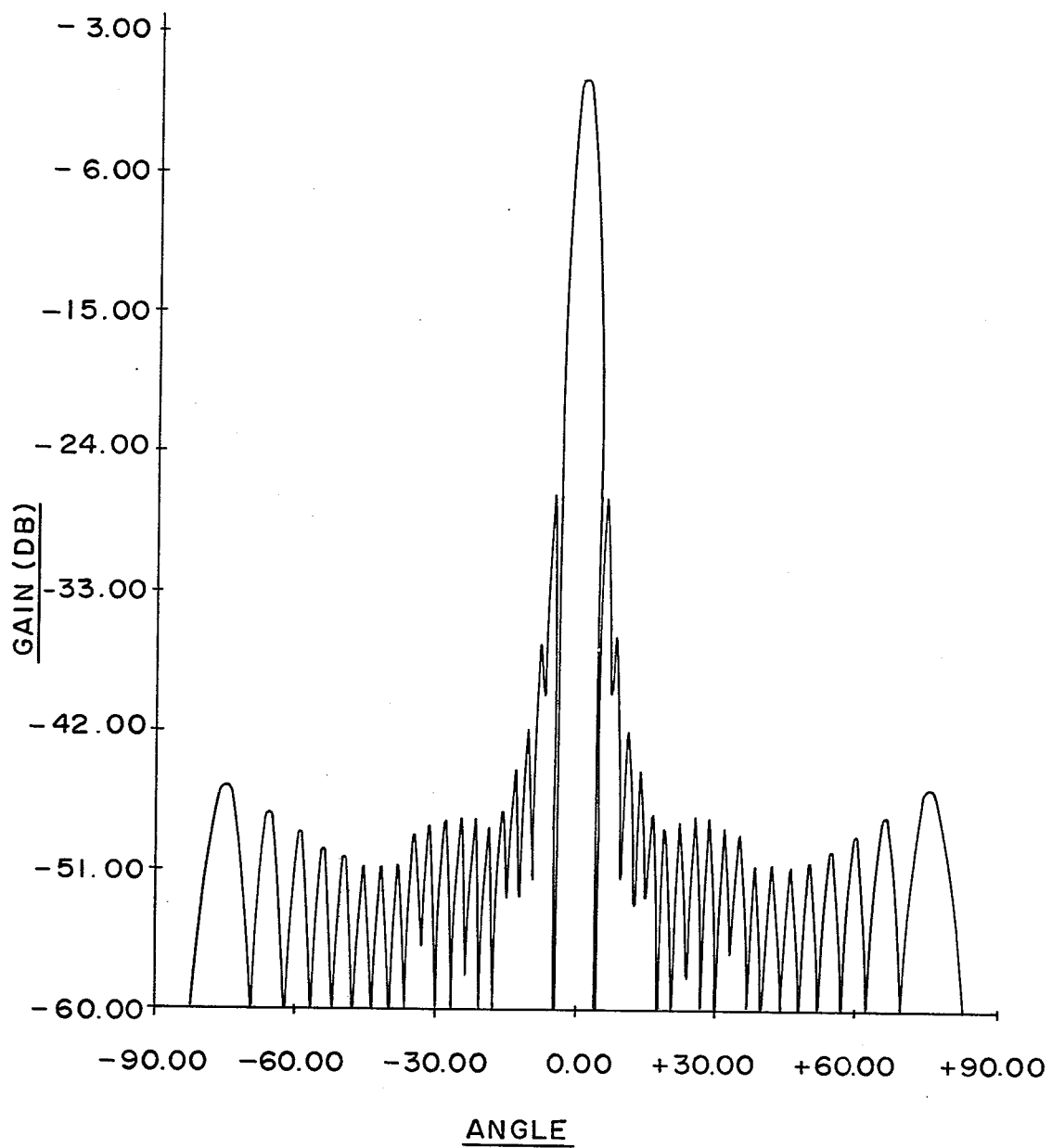
Figure 7:
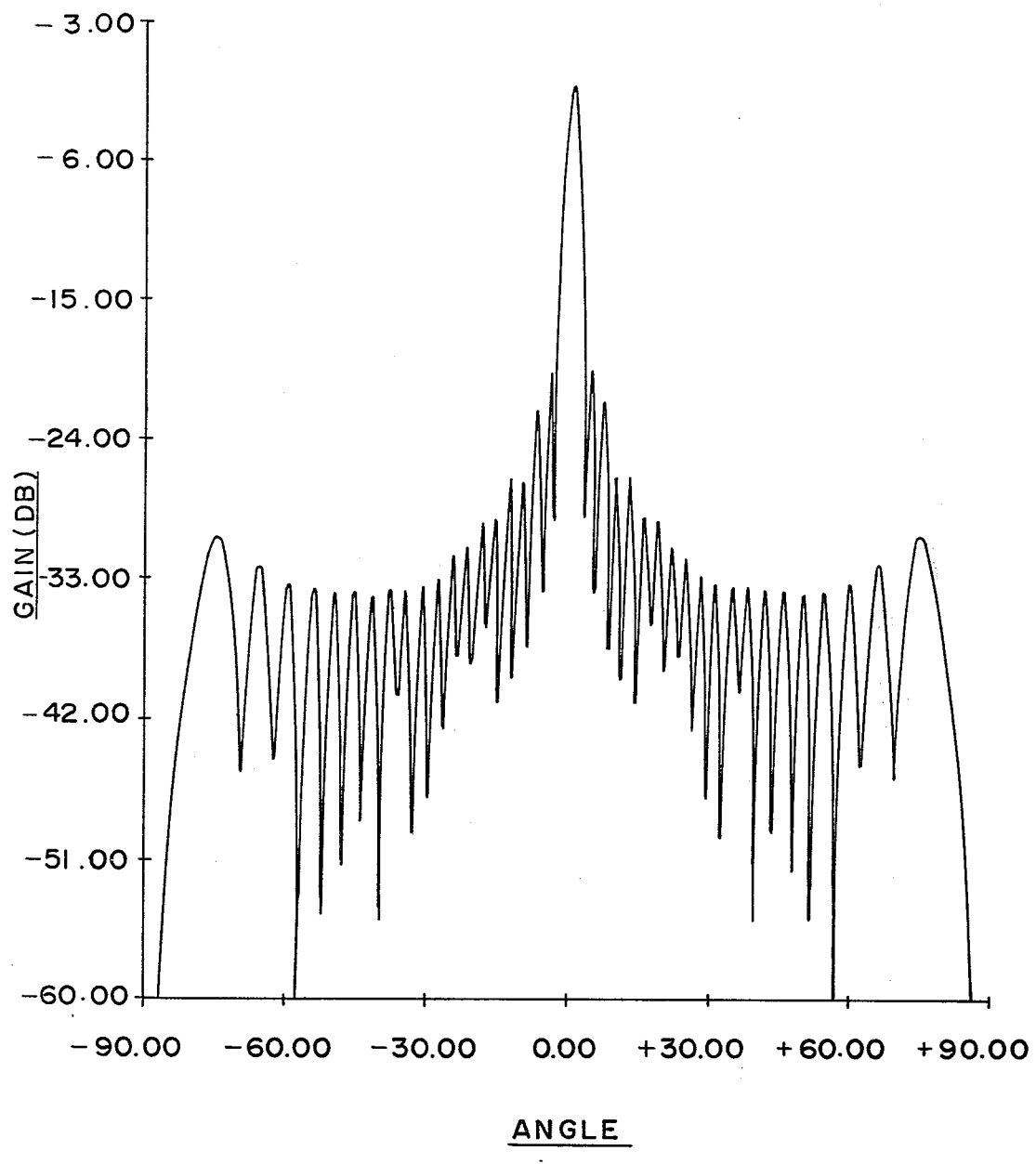

In FIG. 5, the effect of this sidelobe reduction technique is shown for a main beam from a linear array of 40 elements spaced at half wave length intervals, using 20 elements of the array to form the notch in the probe beam. With that number of elements for the probe beam, the width of the notch is approximately twice the width of the main lobe, and the sidelobes are suppressed satisfactorily. If the number of elements used for the probe beam is decreased to 10, the notch is made wider and suppression of the near sidelobes is degraded as may be seen from the graph of FIG. 6 for that condition. Suppression of other sidelobes improves. When the notch is made narrower by using 40 elements for the probe beam in an effort to suppress the near sidelobes more than in FIG. 5, the mainlobe is made narrower as shown in FIG. 7, indicating greater sidelobe reduction in the very near sidelobes, but beyond the very near sidelobes, the reduction is not as great as in FIGS. 5 and 6. The optimum would then seem to be a moderate notch width (FIG. 5), rather than a wider one (FIG. 6) or a narrower one (FIG. 7). This optimum is for an exemplary array. For other arrays, the optimum can be empirically determined in a similar manner.

Although a particular embodiment of the invention has been described and illustrated, it is recognized that modifications and variations may readily occur to those skilled in the art, such as providing direct storage in memory of probe and main beam arrays for digital implementation of this sidelobe reduction technique along with the otherwise conventional digital techniques for synthesizing the main radar receiving pattern and detecting targets in the main beam. Consequently, it is intended that the claims be interpreted to cover such modifications and variations.

What is claimed is:

1. A method for reducing sidelobes in an adaptive receiving array antenna of a pulsed radar system having a plurality of elements by transmitting an auxiliary signal from an omnidirectional antenna and at least some of said elements in a phase relationship selected to form a probe beam having a pattern with a notch in the main-lobe direction of a main beam from said array of elements, receiving a set of return signals $\{v_n\}$ of said probe beam through all elements of said array, adaptively optimizing a set of weighting factors $\{w_n\}$ for said set of probe-beam return signals $\{v_n\}$ to reduce clutter and other interference present in said set of probe-beam return signals, receiving a set of return signals $\{v_n'\}$ of said main beam through all of said set of elements $\{n\}$, multiplying each signal $v_n'$ of said set of return signals $\{v_n'\}$ by a corresponding weighting factor $w_n$ of said set of factors $\{w_n\}$ to form a set of products $\{w_n v_n'\}$, and summing said set of products to form an array output signal, thus synthesizing a receiving pattern for said main beam with sidelobes reduced.

2. A method as defined in claim 1 wherein return signals $\{v_n\}$ of said set of said probe beam are distinguished from said return signals $\{v_n'\}$ of said set of said main beam by transmitting pulses of said probe beam at a first frequency and pulses of said main beam at a second frequency, each pulse of said second frequency being transmitted at a separate time sufficiently close to a pulse of said first frequency to be regarded as being transmitted substantially simultaneously, and separating the sets of return signals $\{v_n\}$ and $\{v_n'\}$ according to frequency.

3. A method as defined in claim 1 wherein return signals of said set $\{v_n\}$ of said probe beam are distinguished from said return signals $\{v_n'\}$ of said set of said main beam by transmitting at least one pulse of said probe-beam signal at a time sufficiently separated from pulses of said main-beam signal to allow said set of weighting factors $\{w_n\}$ to be produced and stored before receiving pulses of said main-beam signal while said array antenna is being steered in a given direction.

4. A method as defined in claim 1 wherein each of said set of weighting factors $\{w_n\}$ is produced by forming the complex conjugate $v_n^*$ of said probe-beam return signals $v_n$ from a given element n, multiplying said complex conjugate $v_n^*$ by an adaptive array output E for said probe beam to form a product $z_n$, where said output is produced according to the function $$E = \sum_{n=1}^{N} w_n v_n$$

low-pass filtering said product $z_n$, thereby providing a signal $u_n$, and subtracting said signal $u_n$ from a steering signal $s_n^*$ to obtain said weighting factor $w_n$, where said steering signal is one of a set of steering signals $\{s_n^*\}$ for an array steering vector.

5. In an adaptive receiving array antenna of a pulsed radar, said antenna having a plurality of elements, apparatus for reducing receiving pattern sidelobes comprised of means for transmitting an auxiliary signal from an omnidirectional antenna and at least some of said elements in a pattern with a notch in the main-lobe direction of said main beam, means connected to receive a set of return signals $\{v_n\}$ of said probe beam through all elements of said array for adaptively optimizing a set of weighting factor signals $\{w_n\}$ for said set of probe-beam return signals $\{v_n\}$ to reduce clutter and other interference present in said set of probe-beam return signals, means connected to receive a set of return signals $\{v_n'\}$ of said main beam through all of said set of elements, and to receive said set of weighting factors $\{w_n\}$ for multiplying each signal $v_n'$ of said set of return signals $\{v_n'\}$ by a corresponding weighting factor $w_n$ to form a set of product signals $\{w_n v_n'\}$, and means for summing said set of product signals to form an array output signals, thus synthesizing a receiving pattern for said main beam with sidelobes reduced.

6. Apparatus as defined in claim 5 wherein said means for producing said set of weighting factors $\{w_n\}$ includes means for forming the complex conjugate $v_n^*$ of a probe-beam return signal $v_n$ from a given element n, means for multiplying said complex conjugate $v_n^*$ by an adaptive array output E for said probe beam to form a product $z_n$, where said output E is produced according to the function $$E = \sum_{n=1}^{N} w_n v_n$$

means for low-pass filtering said product $z_n$, thereby providing a signal $u_n$, and means for subtracting said signal $u_n$ from a steering signal $s_n^*$ to obtain said weighting factor $w_n$, where said steering signal is one of a set of steering signals $\{s_n^*\}$ for an array steering vector.

* * * * *